US009014547B2

(12) United States Patent
Terunuma (10) Patent No.: US 9,014,547 B2
(45) Date of Patent: *Apr. 21, 2015

(54) PLAYBACK APPARATUS AND METHOD OF CONTROLLING THE PLAYBACK APPARATUS

(75) Inventor: Yoshikazu Terunuma, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 328 days.

This patent is subject to a terminal disclaimer.

(21) Appl. No.: 13/083,290

(22) Filed: Apr. 8, 2011

(65) Prior Publication Data

US 2011/0182364 A1    Jul. 28, 2011

Related U.S. Application Data

(63) Continuation of application No. 12/540,311, filed on Aug. 12, 2009, now Pat. No. 7,945,145.

(30) Foreign Application Priority Data

Aug. 12, 2008   (JP) .................................. 2008-208141

(51) Int. Cl.
*H04N 5/917*     (2006.01)
*H04N 21/432*    (2011.01)
(Continued)

(52) U.S. Cl.
CPC ........... *H04N 21/4325* (2013.01); *H04N 5/775* (2013.01); *H04N 21/4122* (2013.01); *H04N 21/42646* (2013.01); *H04N 21/440263* (2013.01); *H04N 21/4854* (2013.01)

(58) Field of Classification Search
USPC .......... 386/232, 335, 336, 353–356; 348/441, 348/445, 446; 382/232
See application file for complete search history.

(56) References Cited

U.S. PATENT DOCUMENTS 6,507,615 B1 *  1/2003  Tsujii et al. .............. 375/240.04
7,420,496 B2    9/2008  Kim et al.
(Continued)

FOREIGN PATENT DOCUMENTS

JP      09-069987 A    3/1997
JP    2002-010253 A    1/2002
(Continued)

OTHER PUBLICATIONS

Japanese Office Action in application No. 2010-096238 mailed on Mar. 27, 2012 in 4 pages.
(Continued)

*Primary Examiner* — Thai Tran
*Assistant Examiner* — Mishawn Dunn
(74) *Attorney, Agent, or Firm* — Knobbe, Martens, Olson & Bear, LLP (57) ABSTRACT

According to one embodiment, a playback apparatus includes a multimedia processor having a decoding circuit to decode encoded video data and an arithmetic module configured to execute high pixel conversion for increasing a quantity of pixels of the decoded video data, a decoding module configured to decode the encoded video data, an issuing module configured to issue a changeover request for changing over between execution and non-execution of the high pixel conversion, and a changeover module configured to change over a providing destination of the encoded video data from any one of the multimedia processor and the decoding module to the other one thereof such that a picture group structure which is a unit for controlling the encoded video data is not divided, in response to the changeover request issued by the issuing module.

18 Claims, 8 Drawing Sheets

(51) Int. Cl.
*H04N 5/775* (2006.01)
*H04N 21/41* (2011.01)
*H04N 21/426* (2011.01)
*H04N 21/4402* (2011.01)
*H04N 21/485* (2011.01)

(56) References Cited

U.S. PATENT DOCUMENTS

| | | | |
|---|---|---|---|
| 7,945,145 B2 * | 5/2011 | Terunuma | 386/356 |
| 7,957,628 B2 * | 6/2011 | Mizutani | 386/356 |
| 2003/0112367 A1 * | 6/2003 | Kang et al. | 348/441 |
| 2007/0223887 A1 | 9/2007 | Kanamori et al. | |
| 2008/0069457 A1 * | 3/2008 | Matsumoto | 382/232 |
| 2008/0155586 A1 * | 6/2008 | Yang et al. | 725/32 |
| 2008/0205791 A1 | 8/2008 | Ideses et al. | |
| 2009/0046995 A1 | 2/2009 | Kanumuri et al. | |
| 2009/0232213 A1 | 9/2009 | Jia | |
| 2010/0002071 A1 | 1/2010 | Ahiska | |

FOREIGN PATENT DOCUMENTS

| | | |
|---|---|---|
| JP | 2002-77834 | 3/2002 |
| JP | 2003-224846 A | 8/2003 |
| JP | 2007-074481 A | 3/2007 |
| JP | 2008-042683 A | 2/2008 |
| JP | 2008-067316 A | 3/2008 |
| JP | 2008-153865 A | 7/2008 |

OTHER PUBLICATIONS

K. Hinokida et al., "Media Streaming Processor Spurs Engine and the Application Examples," Toshiba Review, Japan, Toshiba Corporation, Jul. 1, 2008, vol. 63, No. 7, p. 17-21.

Notice of Reasons for Rejection mailed by Japan Patent Office on Jan. 5, 2010 in the corresponding Japanese patent application No. 2008-208141.

* cited by examiner

PLAYBACK APPARATUS AND METHOD OF CONTROLLING THE PLAYBACK APPARATUS

CROSS-REFERENCE TO RELATED APPLICATIONS

This application is a continuation of U.S. patent application Ser. No. 12/540,311 filed on Aug. 12, 2009, which is based upon and claims the benefit of priority from Japanese Patent Application No. 2008-208141 filed on Aug. 12, 2008, the entire contents of both which are incorporated herein by reference.

BACKGROUND

1. Field

One embodiment of the invention relates to a playback apparatus which changes over between execution/non-execution of high pixel conversion processing and a method of controlling the playback apparatus.

2. Description of the Related Art

Recently, TV units based on full high definition of 1920× 1080 in quantity of pixels have been often seen. However, there is not so much full-high-definition content. Then, DVD content and the like of conventional standard definition images have been subjected to high pixel conversion processing (up-conversion) to be converted to high-definition images and then enjoyed through full-high-definition TV units.

Jpn. Pat. Appln. KOKAI Publication No. 2008-153865 has disclosed a method for acquiring the standard information of a specified content, inquiring of a user whether or not the up-conversion is executed according to the standard information and executing the up-conversion according to its result so as to record that content in a recording portion.

There are some high pixel conversion processing methods available. For example, bi-cubic convolution and bi-linear interpolation are available. The bi-cubic convolution applies a higher load to a processor than the bi-linear interpolation.

Currently, personal computers cannot execute the bi-cubic convolution in real time. Then, it can be considered to make other high-speed processor than the processor which executes its operating system and some application perform the high pixel conversion processing using the bi-cubic convolution.

For example, connecting the other high-speed processor to a bridge circuit using PCI express standard serial bus can be considered. The PCI express standard enables bi-directional communication to be executed. The effective data transmission rate in a single direction of the PCI express standard is about 250 MB/sec. On the other hand, transmission rate necessary for transmitting full-high-definition video data is about 187 MB/s. Thus, there is not so much room in usable transmission rate for transmission of the full-high-definition video data on the PCI express standard and consequently, it is preferable to reduce the quantity of data which is to be supplied to the other processor as much as possible.

On the other hand, whether or not a user prefers the images subjected to the high pixel conversion processing depends largely on the user's own preference. Thus, there exists a user's request for comparing moving image by changing over between execution and non-execution of the high pixel conversion processing dynamically during playback of the moving image.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a playback apparatus comprises a multimedia processor having a decoding circuit to decode encoded video data and an arithmetic module configured to execute high pixel conversion for increasing a quantity of pixels of the decoded video data, a decoding module configured to decode the encoded video data, an issuing module configured to issue a changeover request for changing over between execution and non-execution of the high pixel conversion, and a changeover module configured to change over a providing destination of the encoded video data from any one of the multimedia processor and the decoding module to the other one thereof such that a picture group structure which is a unit for controlling the encoded video data is not divided, in response to the changeover request issued by the issuing module.

Embodiments of the present invention will be described below with reference to the accompanying drawings.

First, the structure of a playback apparatus according to the embodiment of the present invention will be described with reference to FIGS. 1 and 2. The playback apparatus of the present invention is achieved using a notebook type portable personal computer 10 which functions as an information processing apparatus.

This personal computer 10 can record and play video content data (audio visual content data) such as broadcasting program data, video data input from an external device. That is, the personal computer 10 has a television (TV) function for executing viewing and recording of broadcasting program data transmitted by TV broadcasting signal. This TV function is realized by a TV application program which is installed in, for example, the personal computer 10 preliminarily. The TV function has a function of recording video data input from an external AV device and playback recorded video data and recorded broadcasting program data.

Figure 1:
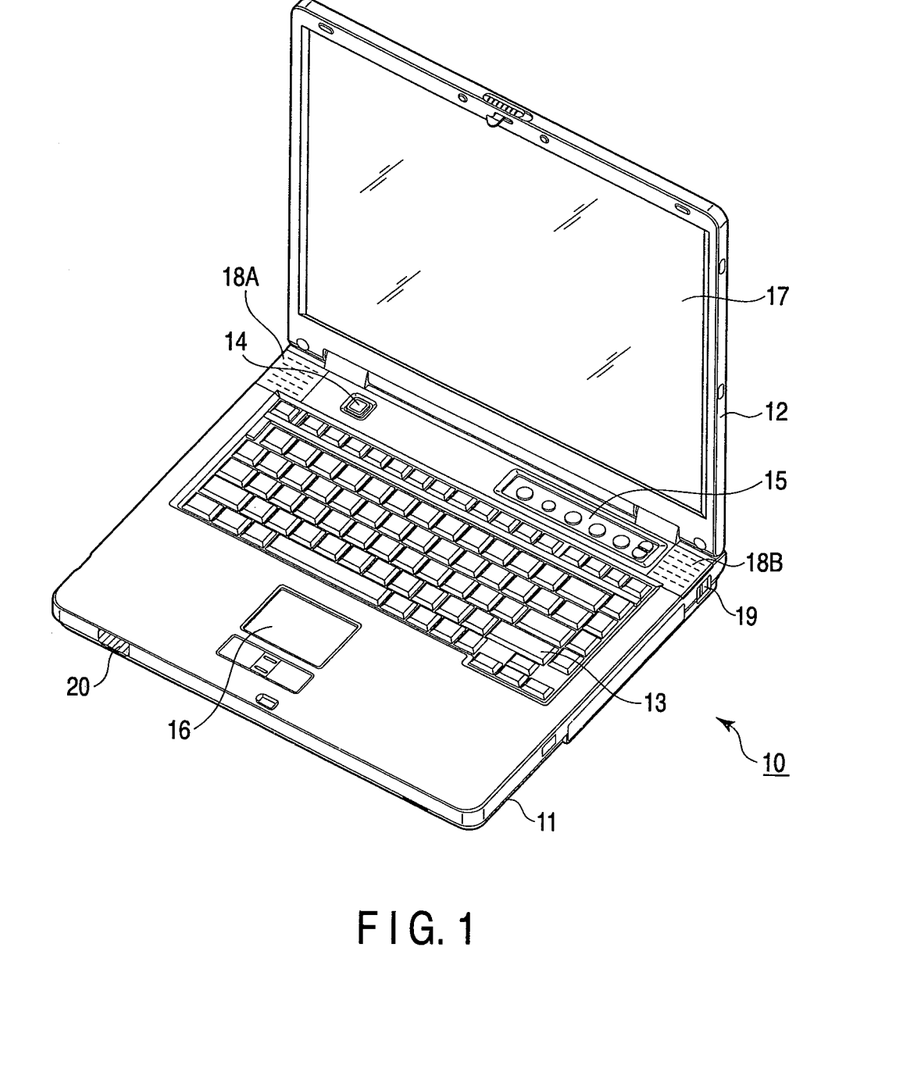
FIG. 1 is an exemplary perspective view showing a notebook type personal computer which is a playback apparatus according to an embodiment of the present invention.

FIG. 1 is a perspective view of a state in which the display unit of the computer 10 is opened. The computer 10 is constituted of a computer main body 11 and a display unit 12. The display unit 12 incorporates a display device constituted of a thin film transistor liquid crystal display (TFT-LCD) 17. The quantity of pixels of the LCD 17 is 1920×1080 based on full high definition.

The display unit 12 is installed to the computer main body 11 such that the display unit 12 can be rotated between an open position where the top face of the computer main body 11 is exposed and a closed position where the top face of the computer main body 11 is covered. The computer main body 11 has a thin box-like case and, a keyboard 13, a power button 14 for turning on/off the power of the computer 10, an input control panel 15, a touchpad 16, and speakers 18A, 18B are disposed on the top face thereof.

The input control panel 15 is an input device for inputting an event corresponding to a pressed button and has plural buttons for starting plural functions. This button group includes a control button group for controlling the TV function (viewing, recording, playback of recorded broadcasting program data/video data). Further, a remote control unit interface portion 20 for executing communication with a remote control unit which remote-controls the TV function of the computer 10 is provided on the front face of the computer main body 11. The remote control unit interface portion 20 includes an infrared ray signal receiving portion.

A TV broadcasting antenna terminal 19 is provided in the right side face of the computer main body 11. An external display connecting terminal conforming to, for example, high-definition multimedia interface (HDMI) standard is provided in the rear face of the computer main body 11. This external display connecting terminal is used to output video data (moving image data) contained in the video content data such as broadcasting program data to an external display.

Next, the system configuration of the computer 10 will be described with reference to FIG. 2.

Figure 2:
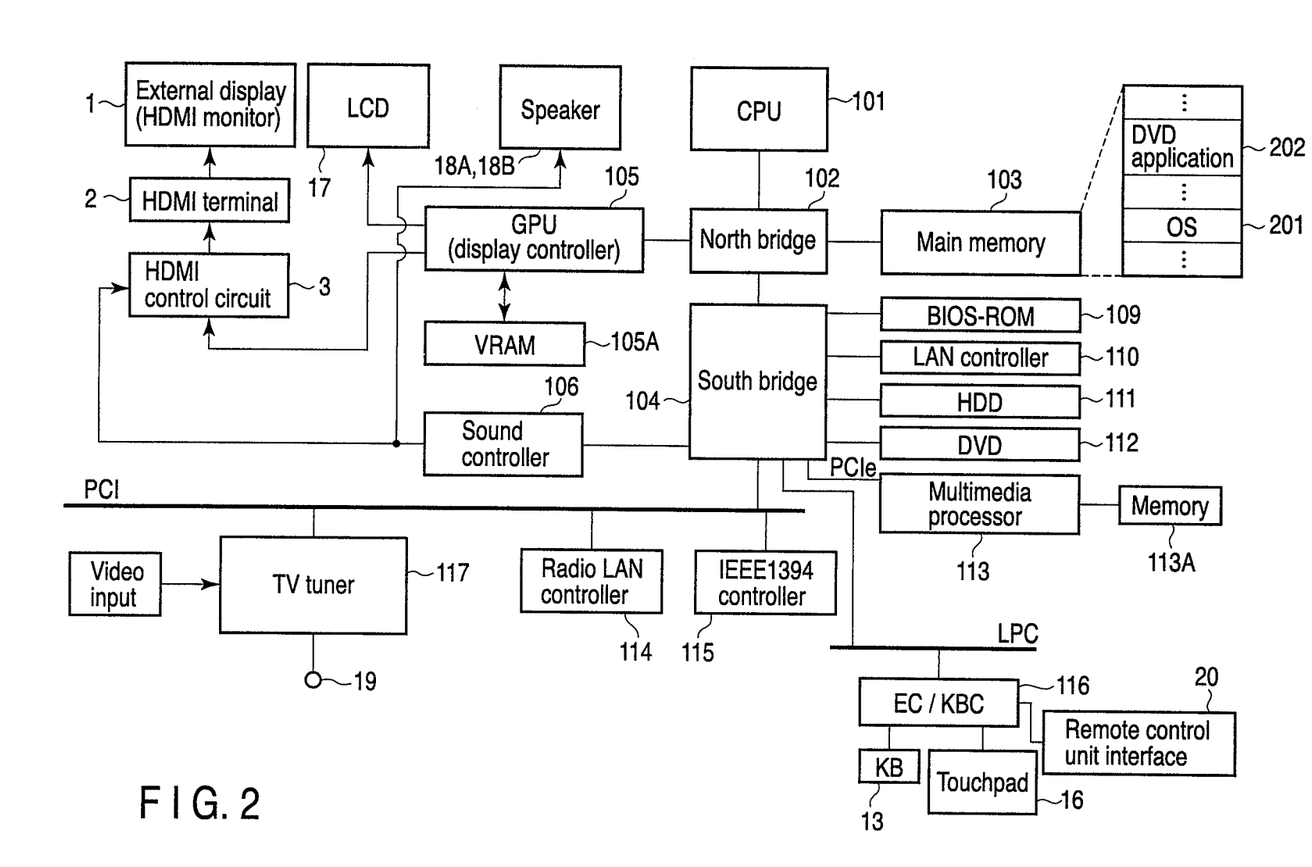
FIG. 2 is an exemplary block diagram showing the system configuration of the personal computer shown in FIG. 1.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a multimedia processor 113, a memory 113A, a wireless LAN controller 114, an IEEE 1394 controller 115, an embedded controller/keyboard controller IC (EC/KBC) 116, a TV tuner 117 and the like.

The CPU 101 is a processor for controlling the operation of the computer 10 and executes an operating system (OS) 201 which is to be loaded to the main memory 103 from the hard disk drive (HDD) 111 and various application programs such as a DVD application program 202. The DVD application program 202 is software for playing a DVD loaded on the DVD drive 112. The CPU 101 executes the basic input/output system (BIOS) which is stored in the BIOS-ROM 109. The BIOS is a program for controlling hardware.

The north bridge 102 is a bridge device for connecting the local bus of the CPU 101 with the south bridge 104. The north bridge 102 contains a memory controller for an access-control of the main memory 103. The north bridge 102 has a function of executing communication with the GPU 105 through a PCI EXPRESS standard serial bus.

The GPU 105 is a display controller for controlling the LCD 17 used as a display monitor of the computer 10. Display signals generated by this GPU 105 are sent to the LCD 17. The GPU 105 can send digital video signals to an external display unit 1 through an HDMI control circuit 3 and an HDMI terminal 2.

The HDMI terminal 2 is the above-mentioned external display connecting terminal. The HDMI terminal 2 can send uncompressed digital video signal and digital audio signal to the external display unit 1 such as TV unit through a single cable. The HDMI control circuit 3 is an interface for sending the digital video signal to the external display unit 1 called HDMI monitor through the HDMI terminal 2.

The south bridge 104 controls respective devices on a low pin count (LPC) bus and respective devices on a peripheral component interconnect (PCI) bus. The south bridge 104 contains an integrated drive electronics (IDE) controller for controlling the hard disk drive (HDD) 111 and the DVD drive 112. Further, the south bridge 104 has a function of executing communication with the sound controller 106.

The multimedia processor 113 is connected to the south bridge 104 through a PCI EXPRESS (PCIe) standard serial bus.

Figure 3:
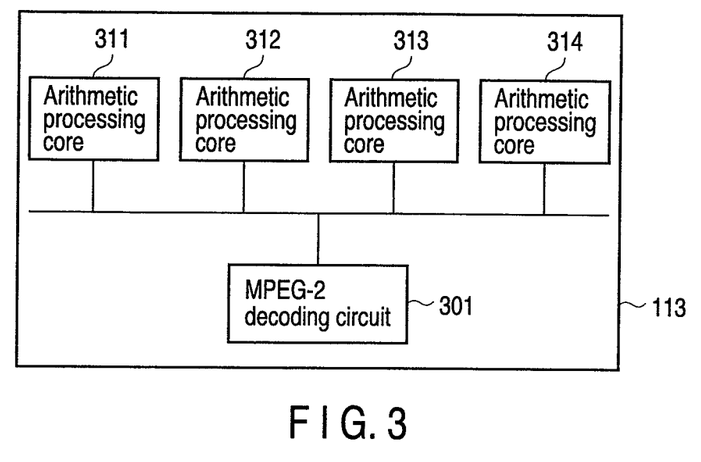
FIG. 3 is an exemplary block diagram showing the system configuration of a multimedia processor shown in FIG. 2.

The memory 113A is used as a working memory of the multimedia processor 113. As shown in FIG. 3, the multimedia processor 113 includes an MPEG-2 decoding circuit 301 for decoding compression-encoded video data and four arithmetic processing cores 311 to 314, these components being formed on a single chip. Each arithmetic processing core 311 to 314 has a high media processing performance and a high performance-to-power-consumption ratio. When the DVD application program 202 plays a DVD, the MPEG-2 decoding circuit 301 decodes video data of the DVD. The four arithmetic processing cores 311 to 314 execute interlace-progressive conversion (IP conversion) processing on video data decoded by the decoding circuit 301 and having 720×480 pixels. The four arithmetic processing cores 311 to 314 execute high pixel conversion processing (up-conversion) of converting SD image video data having 720×480 pixels to HD image having 1920×1080 pixels. The high pixel conversion processing by the multimedia processor 113 uses the bi-cubic convolution (cubic convolution [CC] interpolation). To execute the high pixel conversion processing using the bi-cubic convolution, a large amount of arithmetic operation is required. In this embodiment, the arithmetic processing cores 311 to 314 of the multimedia processor 113 which is a specialized processor different from the CPU 101 are used as a back end processor and the high pixel conversion processing is carried out by this multimedia processor 113. Thus, the high pixel conversion processing can be executed without inducing an increase in load of the CPU 101.

Note that, the DVD application program 202 has a decoding module which is to be executed by the CPU 101 to decode video data. If any video data is decoded using the decoding module of the DVD application program 202 in order to be displayed on the LCD 17, the SD image video data having 720×480 pixels is converted to HD image having 1920×1080 pixels using the high pixel conversion function of the GPU 105. Although the high pixel conversion function of the GPU 105 requires less processing (arithmetic operation amount is smaller) than the bi-cubic (cubic convolution [CC]) method, the high pixel conversion processing is carried out according to the bi-linear interpolation which provides inferior image quality.

The GPU 105 executes the high pixel conversion processing according to the bi-linear interpolation when the quantity of pixels of the video data input to the GPU 105 is different from the quantity of pixels to be output from the LCD 17 or the HDMI terminal 2. The GPU 105 carries out no high pixel conversion processing if the quantity of pixels to be output coincides with the quantity of pixels input to the GPU 105.

Whether the decoding and high pixel conversion are to be carried out by the multimedia processor 113 or by a combination of the DVD application program 202 and the GPU 105 can be selected by a user. Hereinafter, a case where the decoding and high pixel conversion are carried out by the multimedia processor 113 is called up-conversion by the multimedia processor 113.

The sound controller 106 is an acoustic source device and outputs audio data to be reproduced to the speakers 18A, 18B or the HDMI control circuit 3.

The wireless LAN controller 114 is a wireless communication device which executes wireless communication based on, for example, the IEEE 802.11 standard. The IEEE 1394 controller 115 executes communication with an external device through the IEEE 1394 standard serial bus.

The embedded controller/keyboard controller IC (EC/KBC) 116 is a one-chip microcomputer in which an embedded controller for power control and a keyboard controller for controlling the keyboard (KB) 13 and the touchpad 16 are integrated. This embedded controller/keyboard controller IC (EC/KBC) 116 has a function of turning on/off the power of the computer 10 according to an operation of the power button 14 by a user. Further, the embedded controller/keyboard controller IC (EC/KBC) 116 has a function of executing communication with the remote control unit interface portion 20.

The TV tuner 117 is a receiver unit for receiving broadcasting program data broadcast by television (TV) broadcasting signals and connected to the antenna terminal 19. This TV tuner 117 is realized as a digital TV tuner capable of receiving digital broadcasting program data such as digital terrestrial television broadcasting. The TV tuner 117 has a function of capturing video data input from an external device.

The data structure specified in the DVD video system and its control information will be described here.

Figure 4:
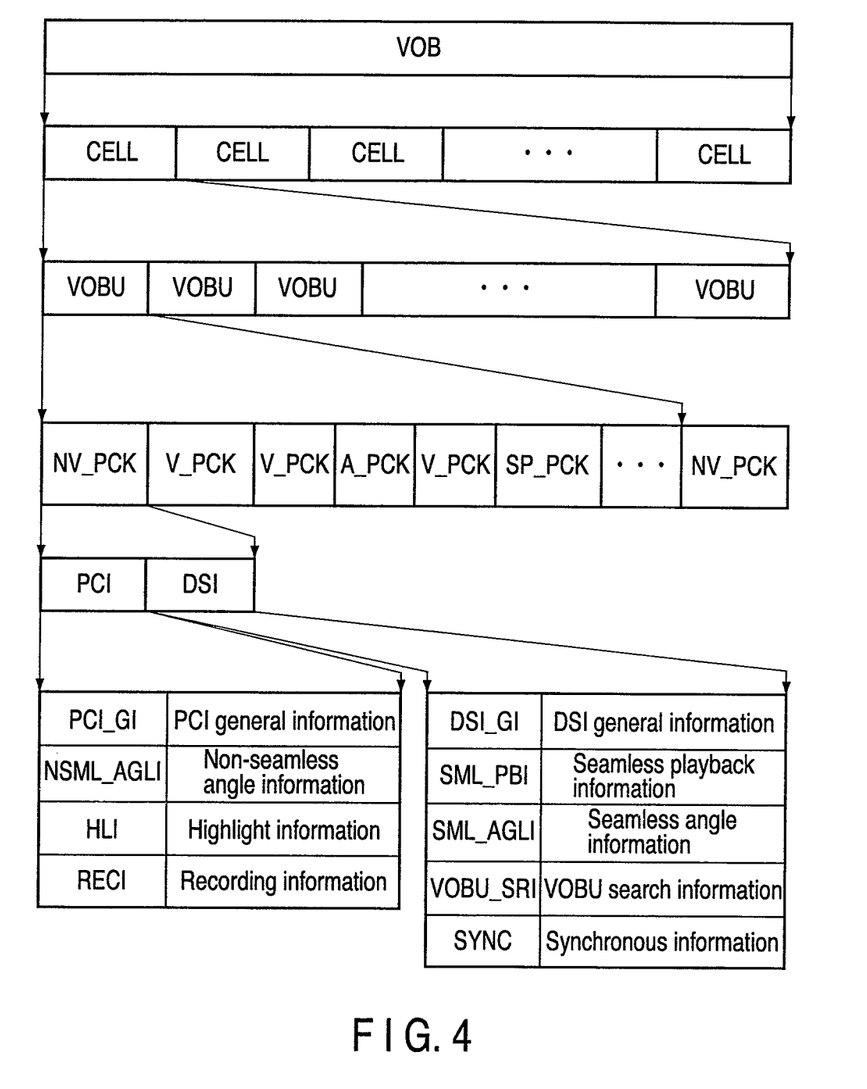
FIG. 4 is an exemplary explanatory diagram of the hierarchical configuration of a video object of a DVD video system and the data content of a navigation pack.

FIG. 4 shows the hierarchical structure of a video object (VOB). The VOB corresponds to a single title and is also called video title set. This corresponds to, for example, a quantity of data contained in a single title of movie. The video object is divided to plural cells and managed to control playing of that video object. A piece of cell is set to contain plural video object units (VOBU). The VOBU is a time unit which is 0.4 to 1.0 second in terms of video playing time. A piece of VOBU is constituted of a navigation pack (NV_PCK), plural video packs (V_PCK), plural audio packs (A_PCK), and plural sub-picture packs (SP_PCK).

A NV_PCK is disposed at a head of a VOBU. The NV_PCK is control data which is referred to when the data of the VOBU to which NV_PCK belongs is reproduced. The NV_PCK is constituted of data search information (DSI) and picture control information (PCI).

The PCI indicates a startup presentation time and termination presentation time of the VOBU. The PCI indicates non-seamless angle information and has an address of the VOBU which should be reproduced next to each angle when the reproduced video stream (angle) is changed over. The PCI has highlight information and contains highlight information startup presentation time, termination presentation time, button display position information and the like.

The DSI has a system clock of the NV_PCK containing this DSI, a termination address of the VOBU, a termination address of reference (I) picture of the VOBU and the like, as general information. Further, as the seamless playback information (SML_PBI), the PCI has a category of the VOBU, a termination address of interleave unit (unit sectioned as a changeover unit of multi-angle), size and startup address of a next interleave unit to which a jump is to be made, and startup and termination addresses of video within the VOB. As the seamless angle information (SML_AGLI), the address and size of an interleave unit of a next destination are prepared by the quantity of angles. As information for use in special playback such as frame advance and back feed, VOBU search information (VOBU_SRI) is prepared and head addresses of plural VOBUs before and after this VOBU are described. Additionally, addresses of audio data and sub-pictures which should be synchronized at the time of jump at the position of the current VOBU are described as synchronous information (SYNC).

Figure 5:
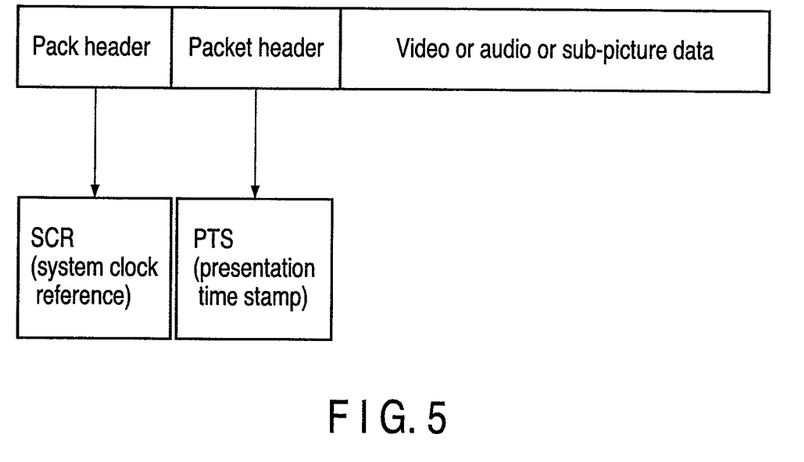
FIG. 5 is an exemplary explanatory diagram of the configuration of video, audio and sub-picture pack.

FIG. 5 shows a pack configuration of a video pack, audio pack and sub-picture pack. The pack is provided with a pack header and a system clock reference (SCR) is described in the pack header. This SCR is described in the VOBU containing an I picture. This SCR is used for resetting a system clock generator within the playback apparatus and setting up a reference time. A packet header is attached next to the pack header. A presentation time stamp (PTS) is described in the packet header. This PTS is always described in the VOBU containing the I picture. Subsequently, video data, audio data or sub-picture data exists. The length of a pack is specified to be 2048 bytes.

As described above, the presentation time stamp (PTS) is described in each pack, and playback of video data, audio data and sub-picture data can be synchronized by reproducing this PTS with time information obtained from a system clock within the playback apparatus.

A group of pictures (GOP) is contained in the video object unit (VOBU) such that it is not divided. The group of pictures (GOP) is constituted of the I picture and B picture and a continuation of this data is divided to video packs. The GOP is a minimum unit for control of the video data in the MPEG-2. If part of the GOP is missing, the decoder cannot decode the GOP properly because prayback processing is carried out for each GOP.

This unit uses different decoders for up-conversion and non-up-conversion. Thus, to change over between the up-conversion and the non-up-conversion, the decoder needs to be changed over without dividing the GOP. Thus, the decoder needs to be changed over at a delimiter of a neighboring GOP. Thus, if a user operates to change over between the up-conversion and non-up-conversion, this unit changes over the decoder at the delimiter of a neighboring GOP.

Figure 6:
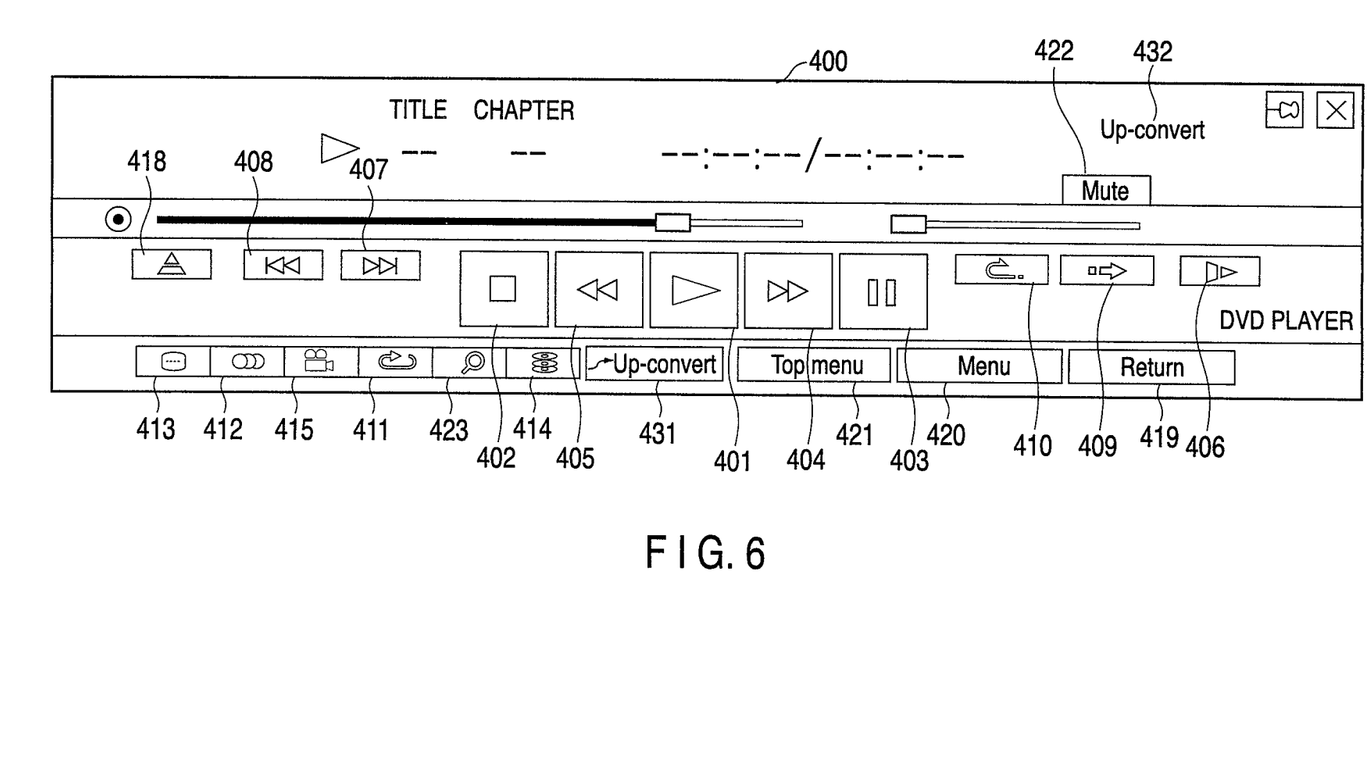
FIG. 6 is an exemplary view showing a playback control panel displayed on an LCD for an operation for changing over up-conversion/non-up-conversion.

FIG. 6 shows a playback control panel 400 displayed on the LCD 17 for operations by a user for changing over between the up-conversion/non-up-conversion. The playback control panel 400 includes a play button 401 for playing back a disk, a stop button 402 for stopping the playback, a pause button 403 for stopping the playback temporarily, a fast forward button 404 for playback by rapid feed, a fast rewind button 405 for playback by rapid back feed, a forward slow playback button 406 for slow playback in a forward direction, a next chapter button 407 for playing back the disk from the head of a next chapter, a previous chapter button 408 for playing the disk from the head of a previous chapter, a one-touch replay button 409 for playing back the disk from about 10 seconds before a current playback position, a one-touch skip button 410 for playing back from about 30 seconds after a current playback position, a repeat button 411 for repeated playback and release of the chapter and title, a sound changeover button 412 for changing over a playback language, a caption changeover button 413 for changing over a caption language, a drive/folder specifying button 414 for specifying a drive/folder, an angle changeover button 415 for changing over the angle, a take-out button 418 for taking out a disk from a drive, a return button 419 for a return, a menu button 420 for displaying a menu, a top menu button 421 for displaying a top menu, a mute button 422 for muting sound volume temporarily, and a chapter/title retrieval button 423 for chapter retrieval and title retrieval. The playback control panel includes an up-conversion changeover button 431 and an up-conversion state display area 432.

When a user presses a left button after he or she moves a pointer onto the up-conversion changeover button 431, the up-conversion/non-up-conversion is changed over. Characters "up-conversion" are displayed in the up-conversion state display area 432 at the time of the up-conversion. The characters "up-conversion" are not displayed in the up-conversion state display area 432 at the time of the non-up convert.

Figure 7:
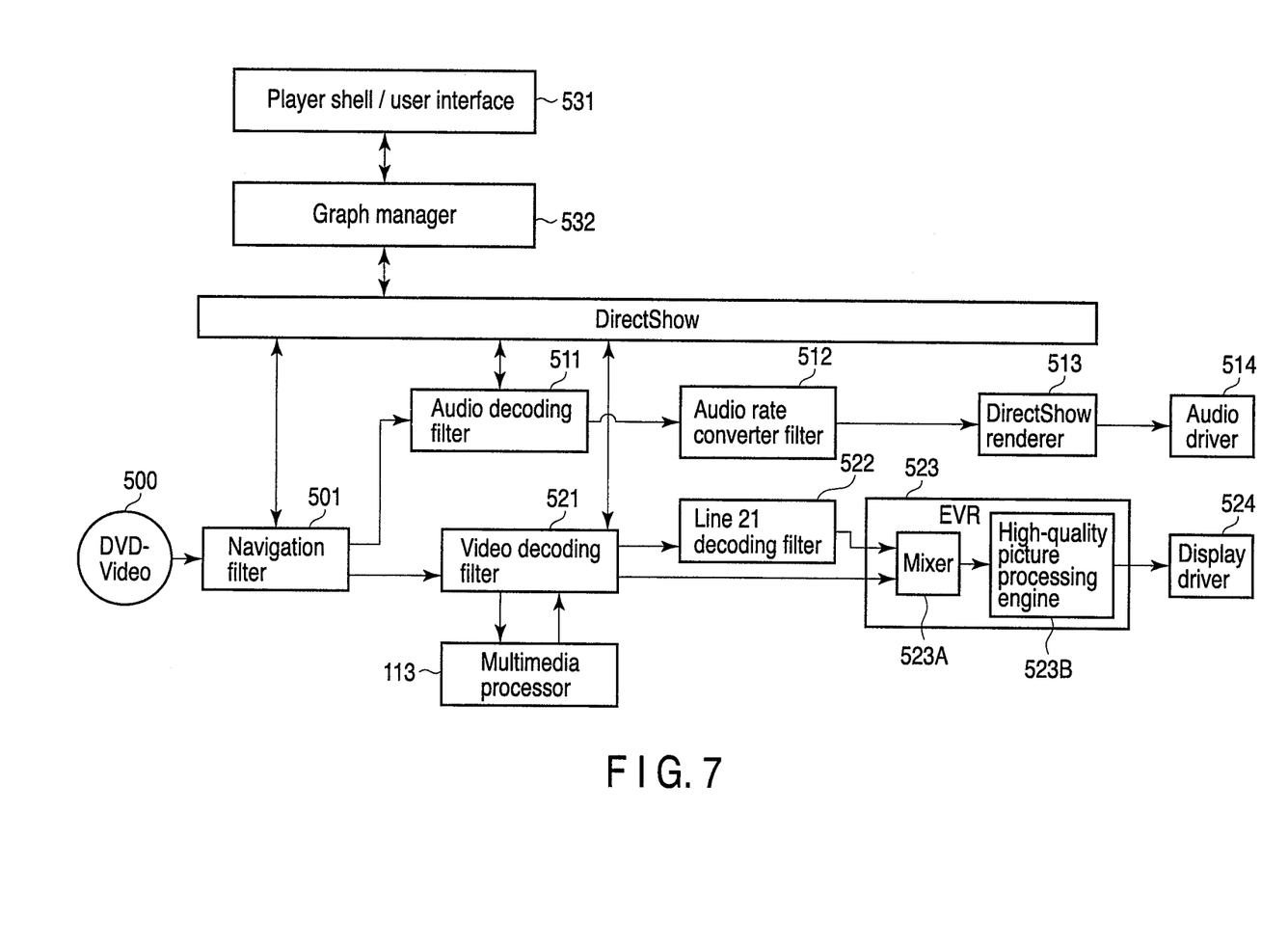
FIG. 7 is an exemplary block diagram showing the configuration of a DVD application to be executed by a CPU.

Next, FIG. 7 shows the configuration of the DVD application program to be executed by the CPU 101 of the playback apparatus. This player software employs a technology called DirectShow which is to be executed under the environment provided by Windows (registered trademark), OS manufactured by Microsoft, in order to reproduce a content. The DirectShow is an assembly of filters having various functions. To reproduce a moving image, a filter graph is built by combining plural filters selected from a filter library having plural filters.

DVD data reproduced by the DVD drive 112 is sent to a navigation filter 501. The navigation filter 501 separates the video pack (V_PCK), the sub-picture pack (SP_PCK) and the audio pack (A_PCK). The navigation filter 501 sends the audio pack (A_PCK) to an audio decoding filter 511. Further, the navigation filter 501 sends the video pack (V_PCK) and the sub-picture pack (SP_PCK) to the video decoding filter.

The audio decoding filter 511 expands compressed audio information to uncompressed audio data and sends the audio data to an audio rate converter filter 512. The audio rate converter filter 512 converts audio data to an appropriate sampling rate and sends it to a DirectShow renderer 513. The DirectShow renderer 513 synthesizes the sent audio data with audio data generated by other software operable on the computer and sends it to an audio driver 514. The audio driver 514 controls the sound controller 106 and outputs audio from the speakers 18A, 18B.

If data of a line 21 is contained in a video decoding filter 521, the data of the line 21 is sent to a line 21 decoding filter 522. The video decoding filter 521 expands video pack (V_PCK) and sub-picture pack (SP_PCK) using an internal decoder module or multimedia processor 113. If the video pack (V_PCK) is expanded by means of the multimedia processor 113, the video data expanded by the multimedia processor is subjected to interlace-progressive conversion (IP conversion) and high pixelating conversion. The expanded video data is sent to an expansion video renderer 523. In the meantime, a mixer 523A in the expansion video renderer 523 executes mixing of video with sub-pictures, processing for displaying a caption and the like. Video data which undergoes the mixing by the mixer 523A is subjected to high-quality picture processing by means of high-quality picture processing engine 523B. The video data which undergoes the high-quality picture processing is sent to a display driver 524. The display driver 524 controls the GPU 105 and displays pictures on the LCD 17.

A player shell/user interface 531 executes processing relating to display on the playback control panel 400. The player shell/user interface 531 notifies the DirectShow 532 of a command corresponding to a button operated by a user through a graph manager 532. The DirectShow 532 controls the navigation filter 501, the audio decoding filter 511 and the video decoding filter 521 according to the notified command.

Next, the configuration for changing over between the up-conversion and the non-up-conversion will be described.

Figure 8:
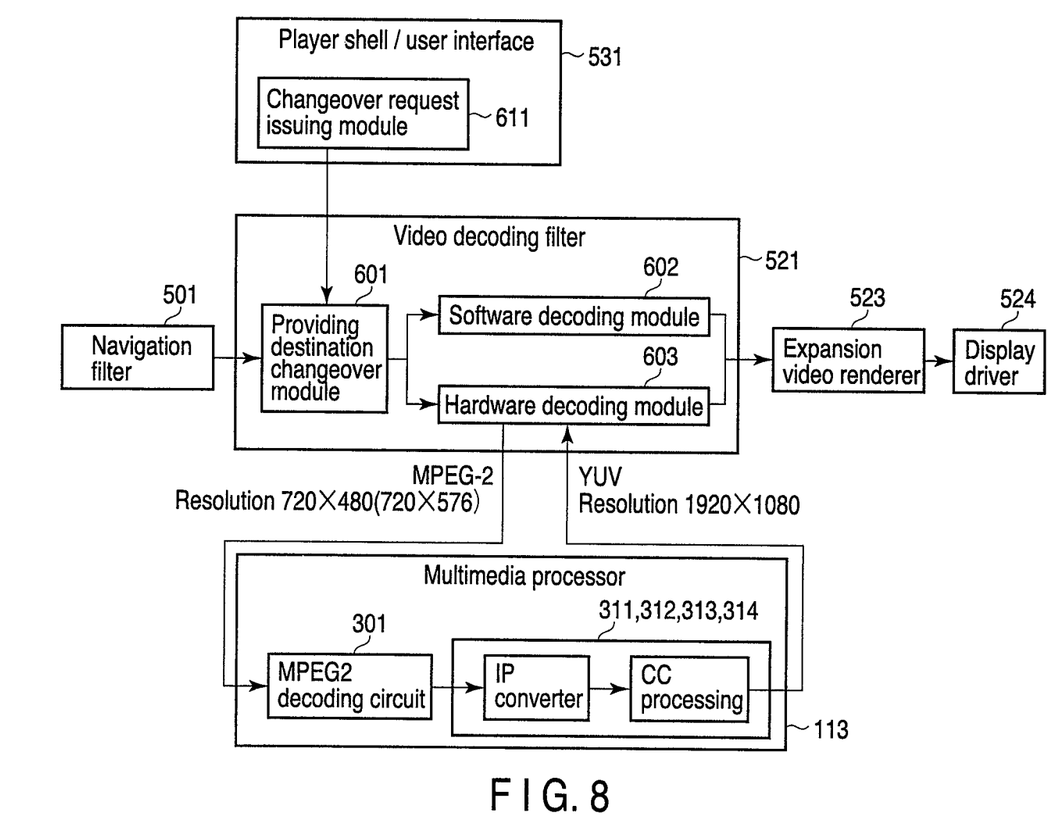
FIG. 8 is an exemplary block diagram for explaining a module for executing up-conversion/non-up-conversion changeover processing according to an embodiment of the present invention.

FIG. 8 is a diagram for explaining a module for executing the processing for changing over the up-conversion/non-up-conversion according to an embodiment of the present invention.

As shown in FIG. 8, this module includes the player shell/user interface 531, the navigation filter 501, the video decoding filter 521, the multimedia processor 113, the expansion video renderer 523, the display driver 524 and the like.

When a user operates the up-conversion changeover button 431, a changeover request issuing module 611 in the player shell/user interface 531 issues a changeover request to the video decoding filter 521.

The video decoding filter 521 includes the providing destination changeover module 601, a software decoding module 602, a hardware decoding module 603 and the like. The providing destination changeover module 601 sends compressed video data supplied from the navigation filter 501 to any one of the software decoding module 602 and the hardware decoding module 603.

Upon detection of a changeover request issued by the changeover request issuing module 611, the providing destination changeover module 601 begins to send the compressed video data sent to any one of the software decoding module 602 and the hardware decoding module 603 to the other one of the software decoding module 602 and the hardware decoding module 603.

The software decoding module 602 expands the received video data so as to generate uncompressed video data and sends the generated video data to the expansion video renderer 523.

The hardware decoding module 603 sends the received video data compressed according to the MPEG-2 method to the multimedia processor 113. The multimedia processor 113 decodes the received video coder using the MPEG-2 decoding circuit 301 so as to generate video data based on interlace method having a resolution of 720×480 or 720×576. Then, the multimedia processor 113 carries out IP conversion and CC processing (up-conversion processing using the bi-cubic convolution) on the video data decoded by the arithmetic processing cores 311 to 314 so as to generate video data based on YUV focusing mat having a resolution of 1920×1080. The multimedia processor 113 returns the up-converted video data to the hardware decoding module 603. The hardware decoding module 603 sends the returned video data to the expansion video renderer 523.

Figure 9:
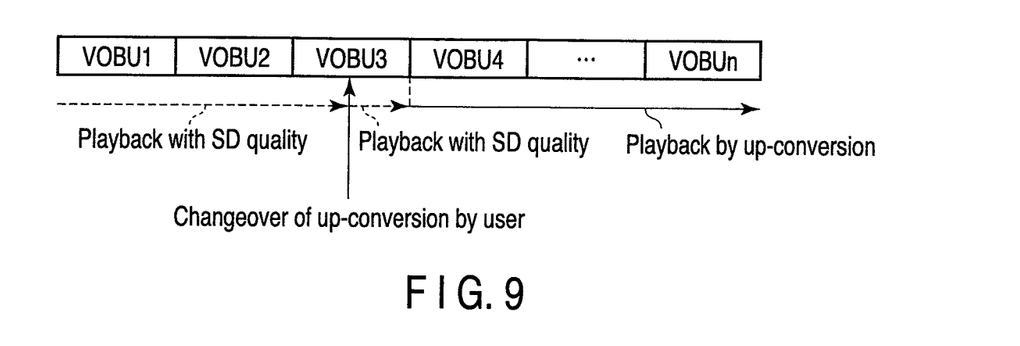
FIG. 9 is an exemplary diagram showing a case where from a state in which playback is carried out with non-up-converted standard definition images, user instructs the up-conversion so as to reproduce the up-converted images.
Figure 10:
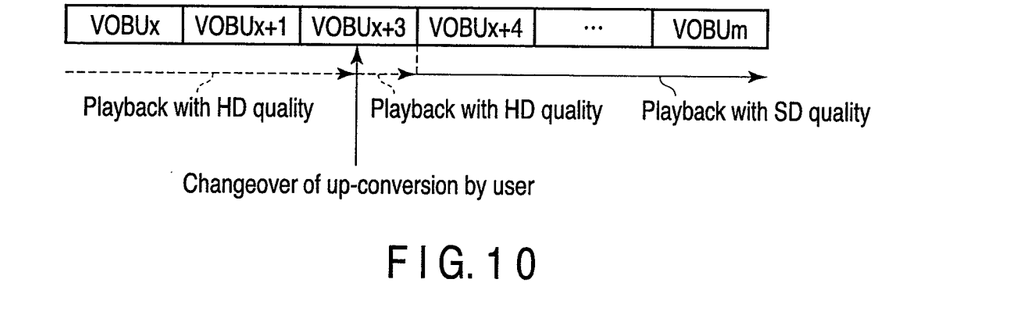
FIG. 10 is an exemplary diagram showing a case where from a state in which the playback is carried out with up-converted high-definition image, user instructs the non-up-conversion so as to reproduce the non-up-converted standard definition images.

After a user instructs a changeover between the up-conversion and the non-up-conversion, the providing destination changeover module 601 begins to send video data at the delimiter of a neighboring GOP and following video data to the other one of the software decoding module 602 and the hardware decoding module 603 as shown in FIGS. 9 and 10. FIG. 9 shows a case where a user instructs the up-conversion under a state of playback using a non-up-converted SD image so as to reproduce the images by the up-conversion. FIG. 10 shows a case where a user instructs the non-up convert under a state of playback using the up-converted HD quality so as to reproduce images with the non-up-converted SD quality.

Figure 11:
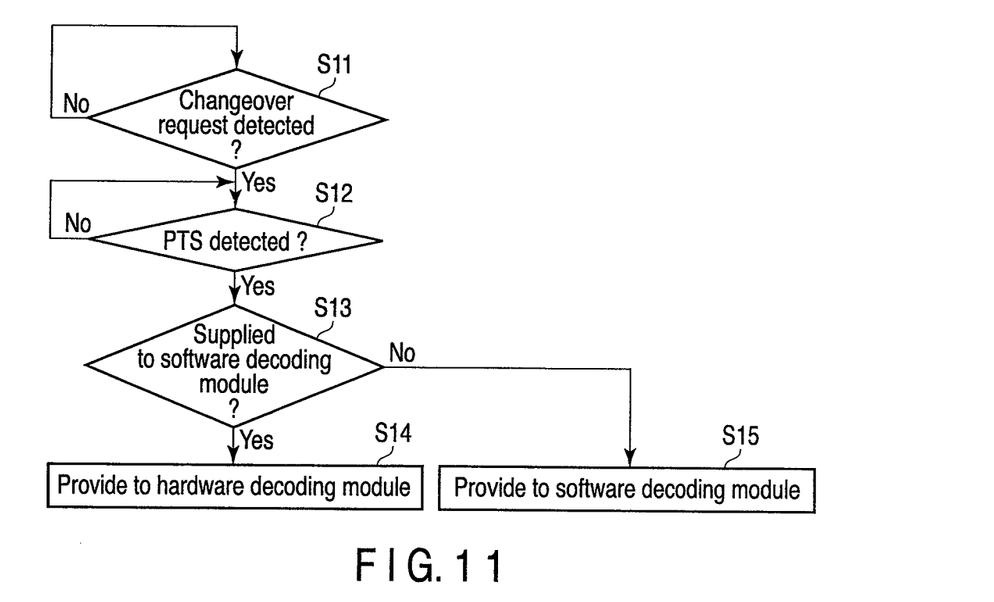
FIG. 11 is an exemplary flowchart showing the procedure of a providing destination changeover module 601.

Next, the procedure of the providing destination changeover module 601 will be described with reference to a flowchart of FIG. 11.

The providing destination changeover module 601 determines whether or not a changeover request is received (block S11). If it is determined that the changeover request is received (Yes in block S11), the providing destination changeover module 601 executes processing of detecting the PTS. If the PTS is detected (Yes in block S12), the providing destination changeover module 601 determines whether or not any compressed video data is provided to the software decoding module 602 (block S13). If it is determined that the software decoding module 602 is provided with the video data (Yes in block S13), the providing destination changeover module 601 changes over the providing destination of the compressed video data to the hardware decoding module 603 (block S14). If it is determined that the compressed video data is not provided to the software decoding module 602 (Yes in block S13), the providing destination changeover module 601 changes over the providing destination of the compressed video data to the software decoding module 602 (block S15).

By providing the multimedia processor 113 with a decoding circuit and sending compressed video data to the multimedia processor 113, the computer 10 of the present invention enables the quantity of data to be transmitted to the multimedia processor 113 to be reduced as compared with a case of sending decoded video data to the multimedia processor 113.

Further, by changing over a transmission destination of the video data compressed at a delimiter of a neighboring VOBU, the changeover between execution/non-execution of the up-conversion processing can be carried out dynamically.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a decoder configured to decode encoded video data;
a converter configured to execute high resolution conversion to convert the decoded video data into high resolution video data;
a display controller configured to display, on a display, a user interface for switching between execution and non-execution of the high resolution conversion, and to reproduce, on the display, either one of the decoded video data or the high resolution video data; and
a switching module configured to switch between execution and non-execution of the high resolution conversion such that a unit for controlling the video data is not divided by the converter in accordance with inputting to the user interface when the encoded video data is going to be decoded,
wherein the switching module is configured to switch between execution and non-execution of the high resolution conversion in accordance with a picture group which is a unit for controlling the encoded video data in a case where the switching module switches from execution of the high resolution conversion to non-execution in accordance with inputting to the user interface when the encoded video data is going to be decoded.

2. The apparatus of claim 1, further comprising:
a central processing unit configured to execute the switching module; and
a hardware processor configured to execute the high resolution conversion and being different from the central processing unit.

3. The apparatus of claim 1, wherein the switching module is configured to switch between execution and non-execution of the high resolution conversion after the inputting to the user interface.

4. The apparatus of claim 1, wherein
the picture group is a group of pictures (GOP), and
the switching module is configured to switch between execution and non-execution of the high resolution conversion of the encoded video data at a delimiter of the GOP.

5. The apparatus of claim 1, wherein the switching module is configured to switch execution and non-execution of the high resolution conversion of the encoded video data at a delimiter of a video object unit (VOBU).

6. The apparatus of claim 1, wherein the switching module is configured to switch between execution and non-execution of the high resolution conversion in accordance with a picture group which is a unit for controlling the encoded video data in a case where the switching module switches from non-execution of the high resolution conversion to execution in accordance with inputting to the user interface when the encoded video data is going to be decoded.

7. The apparatus of claim 6, wherein
the picture group is a group of pictures (GOP), and
the switching module is configured to switch between execution and non-execution of the high resolution conversion of the encoded video data at a delimiter of the GOP.

8. The apparatus of claim 6, wherein the switching module is configured to switch execution and non-execution of the high resolution conversion of the encoded video data at a delimiter of a video object unit (VOBU).

9. A method of controlling an information processing apparatus, the apparatus comprising a decoder configured to decode encoded video data, and a converter configured to execute high resolution conversion to convert the decoded video data into high resolution video data, the method comprising:
displaying, on a display, a user interface for switching between execution and non-execution of the high resolution conversion;
switching between execution and non-execution of the high resolution conversion such that a unit for controlling the video data is not divided in accordance with inputting to the user interface when the encoded video data is going to be decoded; and
reproducing, on the display, either one of the decoded video data or the high resolution video data,
wherein the switching comprises switching between execution and non-execution of the high resolution conversion in accordance with a picture group which is a unit for controlling the encoded video data in a case where the switching module switches from execution of the high resolution conversion to non-execution in accordance with inputting to the user interface when the encoded video data is going to be decoded.

10. The method of claim 9, wherein the high resolution conversion is executed by a hardware processor which is different from a central processing unit configured to switch between execution and non execution non-execution of the high resolution conversion.

11. The method of claim 9, wherein the switching is executed after the inputting to the user interface.

12. The method of claim 9, wherein
the picture group is a group of pictures (GOP), and
the switching comprises switching between execution and non-execution of the high resolution conversion of the encoded video data at a delimiter of the GOP.

13. The method of claim 9, wherein
the picture group is a group of pictures (GOP), and
the switching comprises switching between execution and non-execution of the high resolution conversion of the encoded video data at a delimiter of the GOP.

14. The method of claim 9, wherein the switching comprises switching between execution and non-execution of the high resolution conversion in accordance with a picture group which is a unit for controlling the encoded video data in a case where the switching module switches from non-execution of the high resolution conversion to execution in accordance with inputting to the user interface when the encoded video data is going to be decoded.

15. The method of claim 14, wherein
the picture group is a group of pictures (GOP), and
the switching comprises switching between execution and non-execution of the high resolution conversion of the encoded video data at a delimiter of the GOP.

16. The method of claim 14, wherein the switching comprises switching execution and non-execution of the high resolution conversion of the encoded video data at a delimiter of a video object unit (VOBU).

17. An information processing apparatus comprising:
a decoder configured to decode encoded video data;
a convertor configured to execute high resolution conversion to convert the decoded video data into high resolution video data;
a display controller configured to display, on a display, a user interface for switching between execution and non-execution of the high resolution conversion, and to reproduce, on the display, either one of the decoded video data or the high resolution video data; and
a switching module configured to switch between execution and non-execution of the high resolution conversion by the converter in accordance with inputting to the user interface when the encoded video data is going to be decoded,
wherein the switching module is configured to switch between execution and non-execution of the high resolution conversion in accordance with a picture group which is a unit for controlling the encoded video data in a case where the switching module switches from execution of the high resolution conversion to non-execution in accordance with inputting to the user interface when the encoded video data is going to be decoded, and
the convertor is configured to temporarily stop execution of high resolution processing and to start the execution of the processing from a breakpoint of a unit for controlling video data if the execution of the processing is designated via a user interface in a middle of the unit for controlling the video data.

18. A method of controlling an information processing apparatus, the apparatus comprising a decoder configured to decode encoded video data, and a converter configured to execute high resolution conversion to convert the decoded video data into high resolution video data, the method comprising:
displaying, on a display, a user interface for switching between execution and non-execution of the high resolution conversion;
switching between execution and non-execution of the high resolution conversion such that a unit for controlling the video data is not divided in accordance with inputting to the user interface when the encoded video data is going to be decoded; and
reproducing, on the display, either one of the decoded video data or the high resolution video data; and
temporarily stopping execution of high resolution processing and starting the execution of the processing from a breakpoint of a unit for controlling video data if the execution of the processing is designated via a user interface in a middle of the unit for controlling the video data,
wherein the switching comprises switching between execution and non-execution of the high resolution conversion in accordance with a picture group which is a unit for controlling the encoded video data in a case where the switching module switches from the execution of the high resolution conversion to non-execution in accordance with inputting to the user interface when the encoded video data is going to be decoded.

* * * * *